United States Patent
Jennings

(10) Patent No.: US 8,069,215 B2
(45) Date of Patent: Nov. 29, 2011

(54) CONFIGURABLE DOWNLOADING OF CONTENT POINTED TO IN ELECTRONIC MESSAGES

(75) Inventor: Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1107 days.

(21) Appl. No.: 11/130,633

(22) Filed: May 16, 2005

(65) Prior Publication Data

US 2006/0259567 A1 Nov. 16, 2006

(51) Int. Cl.
*G06F 15/16* (2006.01)
(52) U.S. Cl. ........................ 709/207; 709/217
(58) Field of Classification Search .................. 709/205, 709/206, 207
See application file for complete search history.

(56) References Cited

U.S. PATENT DOCUMENTS

| | | | | |
|---|---|---|---|---|
| 5,771,355 A * | 6/1998 | Kuzma | ............... | 709/232 |
| 6,493,758 B1 * | 12/2002 | McLain | ............... | 709/227 |
| 6,738,813 B1 * | 5/2004 | Reichman | ............... | 709/224 |
| 7,194,514 B1 * | 3/2007 | Yen et al. | ............... | 709/206 |
| 7,403,914 B2 * | 7/2008 | Janakiraman et al. | ......... | 705/26 |
| 7,437,733 B2 * | 10/2008 | Manzano | ............... | 719/315 |
| 2002/0133633 A1 * | 9/2002 | Kumar | ............... | 709/310 |
| 2005/0015721 A1 * | 1/2005 | Tsai | ............... | 715/513 |
| 2006/0206570 A1 * | 9/2006 | Heidloff et al. | ............... | 709/206 |

OTHER PUBLICATIONS

Li Fan, Pei Cao and Wei Lin. Web Prefetching Between Low-Bandwidth Clients and Proxies: Potential and Performance. Quinn Jacobson Department of Electrical and Computer Engineering University of Wisconsin-Madison. 1999.*
University of New Hampshire. Offline Access and Synchronization. Univerisyt of New Hampshire Computing & Information Services. Mar. 11, 2003.*
Cowart et al. Special Edition Using Microsoft® Windows® XP Professional, Third Edition. Que. Dec. 6, 2004. pp. 1-30 (1-18 and 1-11 Internet printout).*
Bishop, A. M., "The WWWOFFLE Homepage," Oct. 6, 2003, [Online] [Retrieved on Feb. 22, 2005] Retrieved from the Internet<URL:http://www.gedanken.demon.co.uk/wwwoffle/>.

* cited by examiner

*Primary Examiner* — Ajay Bhatia
*Assistant Examiner* — Bryan Lee
(74) *Attorney, Agent, or Firm* — Tucker Ellis & West LLP

(57) ABSTRACT

Systems and methods for downloading content referenced by a pointer or link in an electronic message. The downloaded content is stored locally in a cache for viewing offline or over low bandwidth connections. In some embodiments, users can optionally specify preferences for downloading or preloading content. These options include limiting the depth of layers of content to cache, limiting the number of links to cache, limiting the amount of time to spend downloading content, limiting the load on the CPU, limiting the amount of data to download, or restricting downloads to particular content providers or content.

41 Claims, 4 Drawing Sheets

Get Mail Online

Get Mail Online

Get Mail Online

Configurable Download Preferences for Linked Content

Depth Limit
    Layers to Cache _____

Breadth Limit
    Maximum links per pointer _____
    Maximum links per email _____
    Maximum links per group _____

Time Limit
    Limit per pointer _____
    Limit per email _____
    Limit per group _____

CPU Load Limit
    Upper threshold _____
    Lower threshold _____

Data Limit
    Maximum file size _____
    Limit per pointer _____
    Limit per email _____
    Limit per group _____

Content Provider Restrictions
    Preferred sources list: _____
    Special depth limit _____
    Only original domain? Y/N

Content Restrictions
    Only download: _____
    Never download: _____

Fig. 3

Read Mail Offline

CONFIGURABLE DOWNLOADING OF CONTENT POINTED TO IN ELECTRONIC MESSAGES

BACKGROUND OF THE INVENTION

1. Field of the Invention

The present invention relates to a system and method for receiving content via an electronic messaging system. In particular, the present invention relates to a system and method for downloading content referenced by a pointer in an electronic message.

2. Description of the Background Art

Electronic messages commonly contain pointers or links to other electronic content. For example, an email message that advertises a new product may provide a link to a webpage with additional information about the product. In some conventional systems, a document sent over an electronic messaging system may be downloaded to a user's computer without the user specifically requesting it. In contrast, the user must select a link contained in an email message to trigger the downloading of the webpage to the user's computing device. Thereafter, the downloaded content can be stored in the computing device's local memory cache.

Conventional systems obviously require that a user's computing device be connected to the Internet in order to download linked content. However, users often read electronic messages offline, such as on a plane. Thus, when reading downloaded new messages offline, a user cannot access the content pointed to in the electronic message.

In conventional systems, even if a user is reviewing messages online, the speed at which linked content can be downloaded and displayed is limited by the bandwidth of the connection. For users downloading linked content on low bandwidth connections, such as cellular connections, there can be a considerable delay between when a user discovers and selects a link in an electronic message and when the linked content is available to display. If a user is charged per unit of connection time, these delays waste both time and money.

What is needed is a system and method that provides quick access to linked content in electronic messages for viewing offline or over low bandwidth connections. Further, a system and method are needed that are configurable to respond to the time, bandwidth, and memory constraints that are present in various electronic messaging systems.

BRIEF DESCRIPTION OF THE DRAWINGS

The invention is illustrated by way of example, and not by way of limitation in the figures of the accompanying drawings in which like reference numerals refer to similar elements.

FIG. 3 lists examples of ways a user can configure download preferences in accordance with a preferred embodiment of the present invention.

DETAILED DESCRIPTION OF PREFERRED EMBODIMENTS

A system and method for downloading content referenced by a pointer or link in an electronic message is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Figure 1:
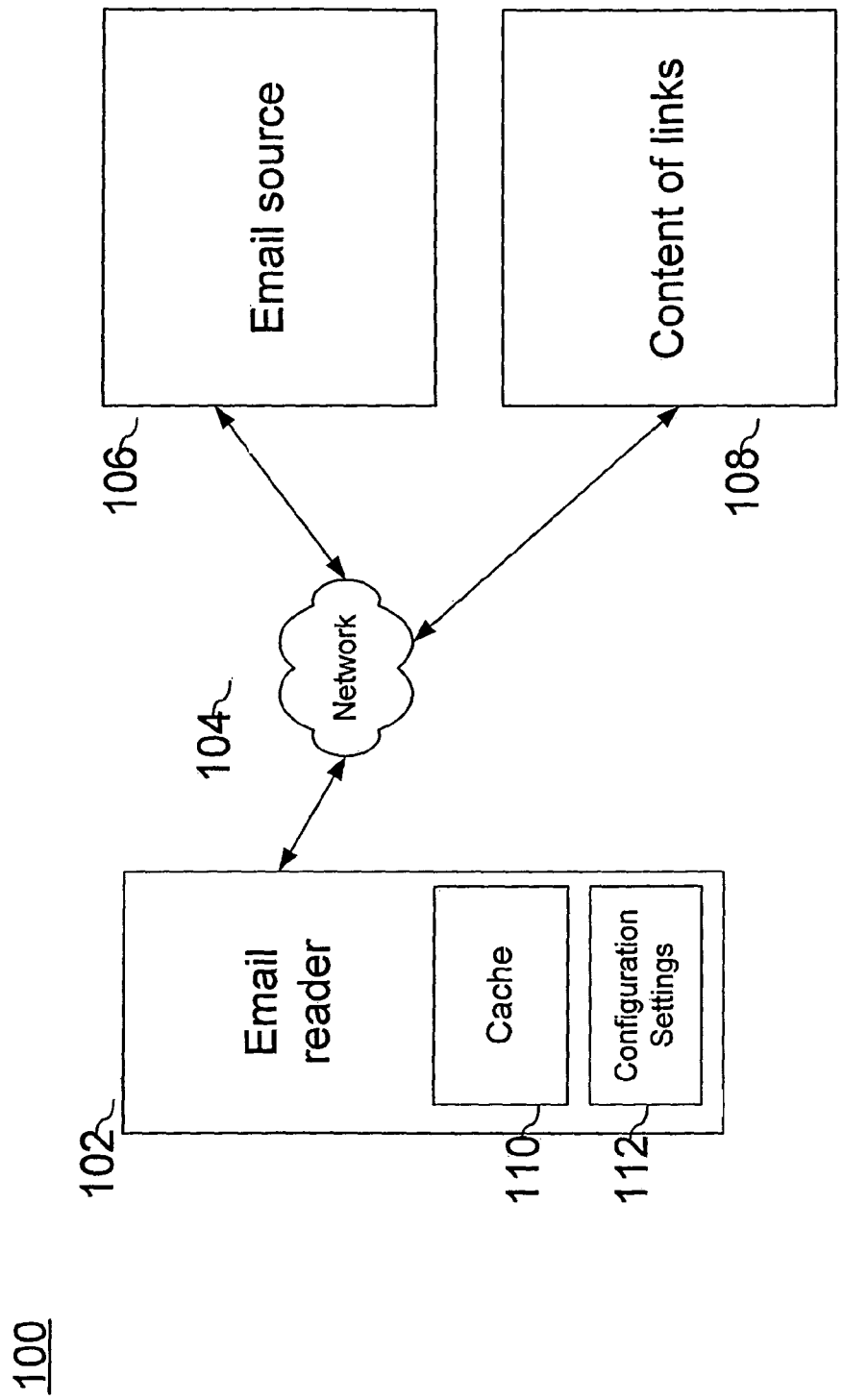
FIG. 1 is a block diagram showing a system for receiving content via electronic messages in accordance with an embodiment of the present invention.

Referring now to FIG. 1, there is shown a block diagram of a system 100 for receiving content via electronic messages, such as email or instant message (IM) messages, in accordance with an embodiment of the present invention. Electronic messages may be from one user to another user. Additionally, electronic messages may be from one operating system to another operating system. System 100 includes an email reader 102. In one embodiment, email reader 102 is an electronic device containing software or hardware capable of receiving electronic messages. Examples of email readers include electronic devices such as personal computers, laptop computers, email appliances, and handheld electronic devices such as personal digital assistants or cellular telephones equipped with electronic messaging capabilities. Email reader 102 includes a cache 110. Preferably, cache 110 is memory local to email reader 102 in which downloaded content can be stored. For example, cache 110 can be a web browser cache for enabling previously downloaded web pages to viewed offline or over a low bandwidth connection without having to wait for the content to load at a slow access speed. Email reader 102 also includes configuration settings 112 in memory as described below.

Email reader 102 is connected at least at some times to a network 104. Network 104 is preferably the Internet, but in other embodiments can be an intranet, a LAN, a WAN, a wireless network, a packet radio network, or any other connection between computers used to transfer electronic messages and other data. System 100 also includes an email source 106, such as another computer, handheld electronic device or the like, from which an electronic message originates. Email source 106 is also connected at least at some times to network 104 to enable the transfer of an electronic message from email source 106 over network 104 to email reader 102. Box 108 represents the content available through network 104 that can be accessed according to pointers or links, such as a Uniform Resource Locator (URL), a link to a web page, an FTP pointer, or the like, that can be included in an electronic message sent by email source 106 and received by email reader 102. Thus, network 104 is also connected to the content of links 108 that may be included in an electronic message.

Figures 2A, 2B:
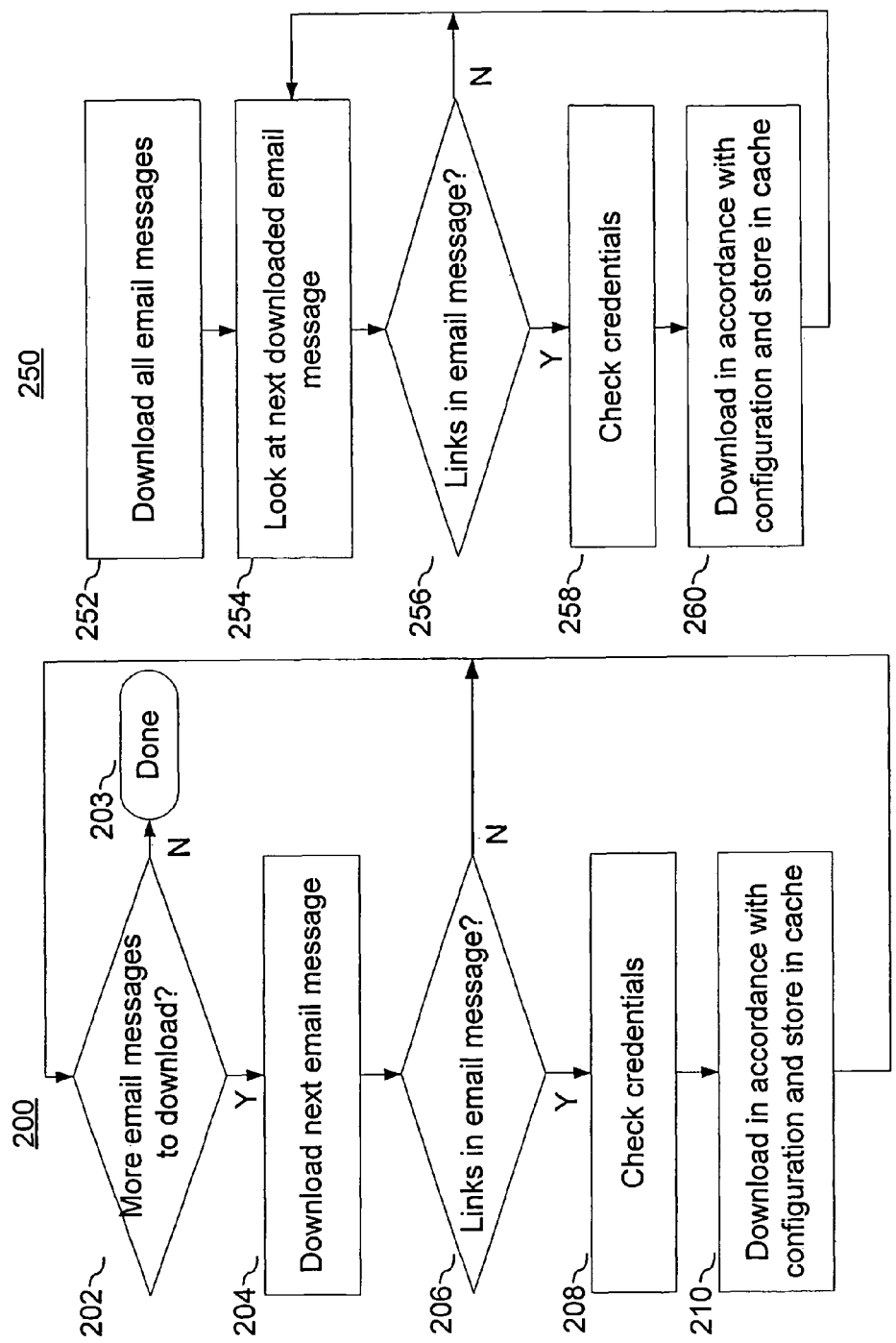
FIG. 2*a* is a flow chart showing a method of getting mail online in accordance with an embodiment of the present invention.
FIG. 2*b* is a flow chart showing a method of getting mail online in accordance with another embodiment of the present invention.

Referring now to FIG. 2*a*, there is shown a flow chart of a method 200 of getting mail online in accordance with an embodiment of the present invention. In this embodiment, one email message is downloaded and checked for links to other content before the next email message is downloaded and checked. The method 200 begins by email reader 102 determining 202 if there are more messages to download. If there are no more messages to download, then the method is finished 203. If, however, there are more messages to download, then email reader 102 downloads 204 the next email message. Email reader 102 then determines 206 if there are links in the email message. If there are no links in the email message, then the next step is to return to determining 202 if there are more email messages to download. If there are one or more links in the email message, then email reader 102 checks 208 credentials. Checking 208 credentials includes accessing any information available to email reader 102 that is needed in order to enable access to the linked content in the email message. For example email reader 102 can be configured to access credentials stored in a cache, in a key management system, or as part of an operating system. Examples of credentials include account names and passwords, computer credentials, cookies, and the like. As part of checking 208 credentials, email reader 102 exchanges the information needed in order to enable downloading of linked content. In step 210, linked content is downloaded to email reader 102 in accordance with the configuration settings 112 and stored in the cache 110. In some embodiments, downloading the content is accomplished using a web protocol, such as http. The protocol used to download content need not be the same protocol as used to receive the message. For example, the message may be downloaded using SMTP while the content is downloaded using FTP Alternatively, the message could be received using any of a variety of other protocols, including for example POP, Web Services, IMAP, SMS, Microsoft's Exchange, IM protocols such as SIP, XMPP, or proprietary protocols such as the ones used by Yahoo, AOL, MSN, and Skype. In addition, the content found in the messages could be retrieved using any of a variety of protocols, including for example HTTP, IMAP, POP, Web Services, NFS, AFS, samba, network file systems, WebDAV, XCAP, ACAP, or LDAP. Furthermore, in some embodiments, user configurable settings 112 for download preferences are available. These configurable settings 112 will be described in greater detail below, with reference to FIG. 3.

FIG. 2b is a flow chart showing a method 250 of getting mail online in accordance with another embodiment of the present invention. In this embodiment, all email messages are downloaded before each is checked in turn for links to other content. The method 250 begins by email reader 102 downloading 252 all email messages. Email reader 102 looks 254 at the next (in this case the first) email message. Email reader 102 determines 256 if there are links in the email message. If there are no links in the email message, then the next step is looking 254 at the next downloaded email message. If there are links in the email message, then email reader 102 checks 258 credentials, as described above with reference to step 208. In step 260, email reader 102 then downloads the linked content in accordance with the configuration settings 112 and stores the content in cache 110. As mentioned above, in some embodiments, user configurable settings 112 for download preferences are available. These configurable settings 112 will be described in greater detail below, with reference to FIG. 3.

FIG. 3 lists examples of ways a user can configure download preferences in accordance with a preferred embodiment of the present invention. These preferences can specify the type and the amount of information that is retrieved and stored as well as the timing of that retrieval. The examples listed in FIG. 3 are described in more detail below. The user's preferences are stored as configuration settings 112.

Depth Limit. Users can configure the limit of layers of linked content to cache. For example, a pointer in an email message may link to 1 webpage that contains links to 5 different pages that each contain links to 5 additional pages. With a limit of layers set at 2, the email reader will download the webpage from the link in the email and all of the pages linked to from that first page, but the email reader will not download the additional pages that are linked to from those pages. In some embodiments, a default depth of content is set at 2 layers, but the default may be set at more or fewer layers. Preferably, the depth of content is configured to be 20 layers or fewer.

Breadth Limit. Users can configure the limit of the number of links to download from any one source. For example, 100 pointers may all be contained within the text of one email message. As another example, an email message may contain only one pointer, but that pointer is to a webpage that contains 100 additional links. In one embodiment, a user can limit the number of links to download from one email message. In another embodiment, a user can set a limit on the number of links to download that depends on the depth of the page that contains the links. For example, a user may set the limit of links to download from the email message at 20, but only want the first 5 links downloaded from each of those 20. In another embodiment, the user sets the total number of links to download from each pointer within an email message. For example, a user can specify a maximum number of web pages of content that may be downloaded per each pointer to a web page from an email message. In another embodiment, the user simply sets the total number of links to download from all links within one email message. In still another embodiment, the user sets the total number of links to download from a group of new messages. In a further embodiment, limits can be applied in some combination of a per pointer, a per email, and a collective basis.

Time Limit. Users can configure the limit of time to spend downloading linked content. Configurable time limits on downloading can be applied to any email reader suitable for the present invention, but this feature is particularly useful to users of email readers who are charged a connection fee per unit of time. In one embodiment, the limit is set on a per pointer basis. For example, the user can specify that the email reader should spend no longer than half a second downloading content from any one pointer in an email message. In another embodiment, the limit is set on a per email basis. For example, the user can specify that the email reader should spend no longer than 1 second downloading content linked from any one email message. In this case, the email reader begins downloading links in an email message in sequence but stops downloading when the time limit is reached for that message. In another embodiment, the limit is set collectively for all emails downloaded in that session. For example, the user can specify that the email reader should spend no longer than 5 seconds downloading content linked from all of the new email messages. In this case, the email reader begins downloading links in each email message in turn but stops downloading when the overall time limit is reached for that group of new messages. In another embodiment, limits can be applied on both a per email and a collective basis.

CPULoad Limit. Users can configure the timing of downloading linked content to be responsive to the load on the CPU. For example, users can specify a threshold, for example 15%, for the load on the CPU where downloading linked content should be cut off so as to avoid slowing down other processes running on the CPU. If a user is merely viewing an email message while still connected to the network, it may be acceptable to continue downloading linked content because the load on the CPU is low. However, if a user switches to a computationally intensive task requiring a lot of CPU cycles that causes the load on the CPU to rise above a certain level, the user may want to stop downloading linked content. Alternatively or additionally, users can specify a lower threshold on the load on the CPU under which downloading of linked content should resume so as to make effective use of bandwidth.

Data Limit. Users can configure various aspects of the amount of data to be downloaded. The ability to limit the amount of data increases in importance as the storage capacity of email reader 102 decreases. In some embodiments, users can configure the maximum size of file to download. Thus, in some embodiments, before downloading each file, a check is performed to ensure that the potential download does not exceed the maximum size set by the user. In another embodiment, the user can configure the maximum amount of data from linked content to download per pointer in an email message, per email message, per group of new messages downloaded, or any combination thereof. In the event that cache memory is full, cache memory may be managed according to any method known in the art. For example, a least recently used cache management method is used in some embodiments.

Content provider restrictions. Users can limit the sources from which linked content will be automatically downloaded. For example, users can specify that only web pages within the domain of the original link will be downloaded, or only web pages from particular domains will be downloaded. In other embodiments, users can create a list of content providers from which downloading should be prevented. In other embodiments, users can create a list of preferred sources of email messages with linked content. In some embodiments, links in emails that are not from preferred sources are not downloaded. In other embodiments, the list of preferred sources interacts with the depth of search limitation. For example, a user may specify that if the source of the email message is not on the preferred sources list, then only the original link in the email message is downloaded, whereas if the source of the email message is a preferred source, then the email reader 102 stores a greater number of layers of links in the cache 110.

Content restrictions. Users can specify restrictions on the types of files to download. For example, a user may limit types of files to download to just html files. Alternatively, a user may select certain file types to never download, such as executable file types or file types for which a particular device did not have the necessary program to enable access to the file. As another example, a user with a device with a small screen size may specify that no images or video should be downloaded. As a further example, a user may specify that no video should be downloaded over a slow connection, but video should be downloaded over a fast connection.

Figure 4:
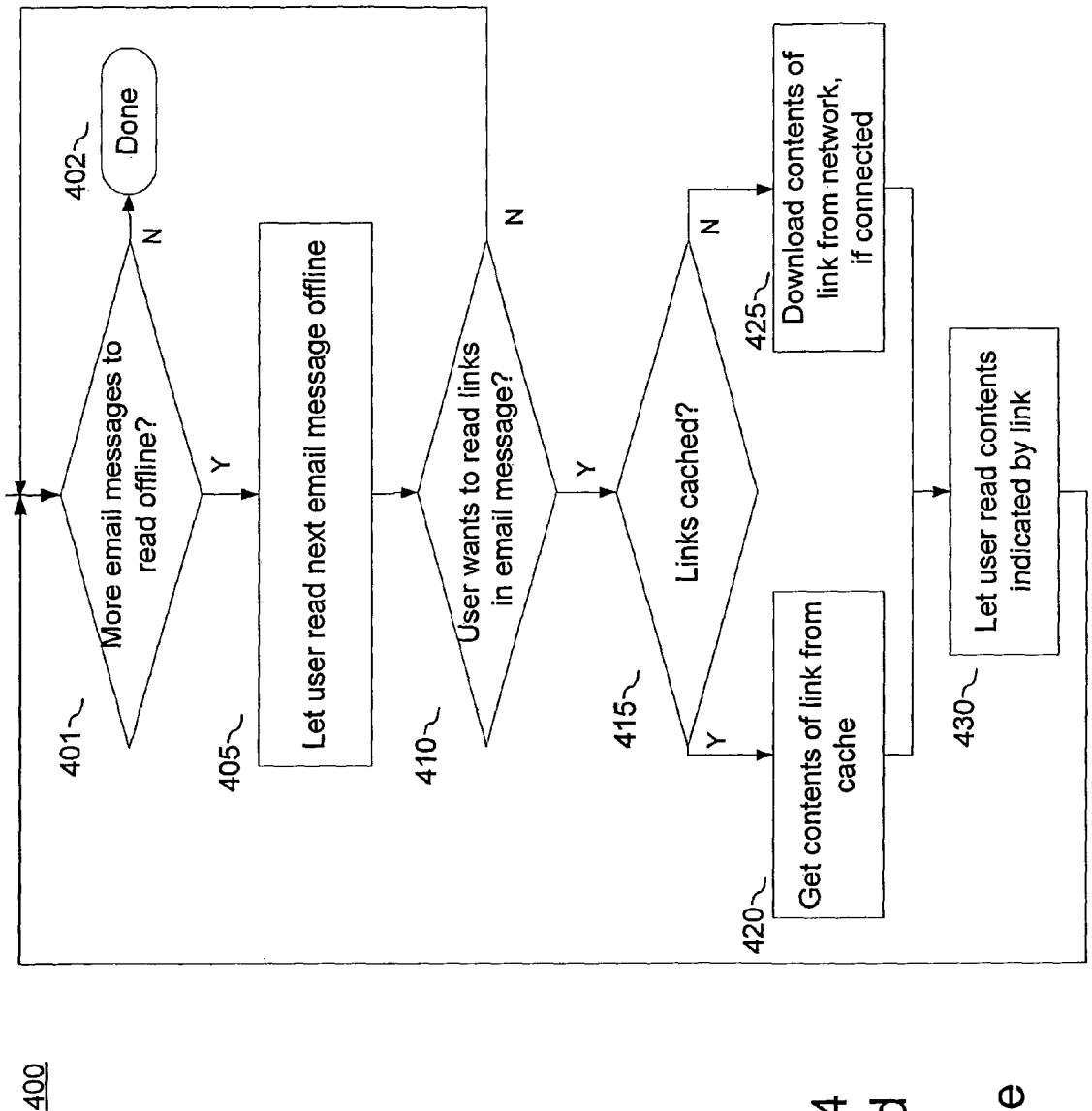
FIG. 4 is a flow chart showing a method of reading mail offline, performed in accordance with a preferred embodiment of the present invention.

FIG. 4 is a flow chart showing a method 400 of reading mail offline, performed in accordance with a preferred embodiment of the present invention. Method 400 is preferably implemented after email messages have been downloaded using, for example, method 200 or method 250 described above. Method 400 begins by determining 401 if there are more email messages to read offline. If there are none, then method 400 is complete 402. If there are more email messages to read offline, then email reader 102 lets 405 the user read the next email message offline. For example, in some embodiments email reader 102 displays the email message on a screen associated with the email reader. In step 410, the email reader determines 410 if a user wants to read links in the email message. For example, a user may indicate that he wants to read links in the email message by selecting one or more links with a cursor, a stylus or other input device. Email reader 102 then determines 415 if the links that the user wants to read are cached. If a particular link is cached, then email reader gets 420 the contents of the link from cache 110. If a particular link is not cached, then email reader 102 downloads 425 the contents of the link from the network 104 provided that the email reader 102 is still connected to the network 104. If the links are not cached and email reader 102 is no longer connected to the network 104, then email reader cannot access the contents of the links. After the email reader 102 has accessed the contents of the link either by getting 420 the links from the cache or by downloading 425 contents of the link from network 104, the email reader 102 lets 430 the user read the contents indicated by the link. Email reader 102 then returns to determining 401 if there are more email messages to read offline. The method 400 continues this cycle until there are no more messages to read offline and the method is finished 402.

It should be noted that the methods and features described above are implemented as part of an email or other messaging program in some embodiments. In other embodiments, the methods and features described above are implemented as a plug-in to an email program. As a plug-in, the application locates links in new email messages, fetches the linked content, and stores it for example in cache memory of a web browser. Preferably, when a user later selects a link from the email message, the web browser is started and checks for the linked content in the cache. In other embodiments, the methods and features described above are implemented in a separate email proxy through which the email program accesses the data. In still other embodiments, the methods and features described above are implemented as a filter that intercepts the communications of the email program with the email server.

Reference in the specification to "one embodiment," "certain embodiments" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of methods and symbolic representations of operations on data bits within a computer memory. These methodic descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Often, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "downloading" or "storing" or "receiving" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the present invention is claimed below operating on or working in conjunction with an information system. Such an information system as claimed may be the entire messaging system as detailed below in the preferred embodiment or only portions of such a system. Thus, the present invention is capable of operating with any information system from those with minimal functionality to those providing all the functionality disclosed herein.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A method, comprising:
   receiving by an electronic message reader an electronic message over an associated network from an electronic message source;
   determining by the electronic message reader whether the electronic message contains a pointer to content responsive to receiving the electronic message;
   accessing stored credentials by the electronic reader to enable access to the content;
   automatically downloading by the electronic message reader at least some of the content over the associated network from a content source in accordance with stored configurable download preferences responsive to receiving the electronic message and determining the electronic message contains a pointer to content before a next electronic message is received;
   storing the downloaded content by the electronic reader in a cache;
   disconnecting from the associated network; and,
   after disconnecting from the associated network and while offline with the associated network, outputting, by the electronic message reader, the received electronic message and the downloaded content from the cache;
   wherein the configurable download preferences further comprises a list of sources from which content can be automatically downloaded;
   wherein the message reader determines whether a source associated with a link is in the list of sources; and
   wherein the message reader limits automatic downloading of content to content associated with links to sources determined to be in the list of sources.

2. The method of claim 1, wherein the downloading includes selectively downloading the content using a protocol different from a protocol used to receive the electronic message.

3. The method of claim 1, wherein the configurable download preferences comprises a maximum depth of content that may be downloaded per each pointer.

4. The method of claim 1, wherein the configurable download preferences comprises a maximum number of web pages of content that may be downloaded per each pointer.

5. The method of claim 1, wherein the configurable download preferences comprises a maximum depth of content that may be downloaded per each message.

6. The method of claim 1, wherein the configurable download preferences comprises a maximum amount of time used to download the content per each message.

7. The method of claim 1, wherein the configurable download preferences comprises a maximum number of web pages of content that may be downloaded per each message.

8. The method of claim 1, further comprising wherein the configurable download preferences comprises a maximum amount of time used to download the content.

9. The method of claim 1, further comprising wherein the configurable download preferences comprises parameters that limit an amount of time spent downloading content per each pointer.

10. The method according to claim 1 wherein the selectively downloading includes:
    selectively downloading the at least some of the content in accordance with a set of configurable download preferences including at least one of: a maximum depth of content that may be downloaded per each pointer, a maximum number of web pages of content that may be downloaded per each pointer, a maximum depth of content that may be downloaded per each message, a maximum amount of time used to download the content per each message, a maximum number of web pages of content that may be downloaded per each message, a maximum amount of time used to download the content, or an amount of time spent downloading content per each pointer.

11. The method of claim 1, wherein the configurable download preferences comprises a central processing unit (CPU) load limit, wherein downloading is cut off responsive to a load on the CPU exceeding the CPU load limit.

12. The method of claim 1, wherein the configurable download preferences further comprises a list of at least one prohibited content provider; and
    wherein the automatic downloading of content does not download content from links pointing to a content provider on the list of at least one prohibited content provider.

13. A method, comprising:
    receiving by an electronic message reader a plurality of electronic messages, over an associated network, from an electronic message source;
    after receiving the plurality of messages determining by the electronic message reader for each message whether the electronic message contains a pointer to content responsive to receiving the electronic message;

after receiving the plurality of messages accessing stored credentials by the electronic reader for each message to enable access to the content;

after receiving the plurality of messages automatically preloading by the electronic message reader for each message at least some of the content over the associated network from a content source in accordance with stored configurable download preferences responsive to receiving the electronic message and determining the electronic message contains a pointer to content before a second electronic message is received;

storing the downloaded content for each message by the electronic reader in a cache; and outputting, by the electronic message reader, the received electronic message and the preloaded content from the cache;

wherein the configurable download preferences further comprises a list of sources from which content can be automatically downloaded;

wherein the message reader determines whether a source associated with a link is in the list of sources; and wherein the message reader limits automatic downloading of content to content associated with links to sources determined to be in the list of sources.

14. The method of claim 13, wherein the configurable download preferences comprises a maximum depth of content that may be downloaded per each message.

15. The method of claim 13, wherein the configurable download preferences comprises a maximum amount of time used to download the content.

16. An apparatus, comprising:

an interface coupled to an associated network for receiving an electronic message that contains a pointer to content from an electronic message source;

a memory comprising configuration settings; and a processor coupled to the interface and having one or more stored sequences of instructions which, when executed by the processor, cause the processor to carry out:

determining by the apparatus whether the electronic message contains a pointer to content responsive to receiving the electronic message, accessing stored credentials by the apparatus to enable access to the content, automatically downloading by the apparatus at least some of the content over the associated network from a content source in accordance with configurable download preferences stored in the memory responsive to receiving the electronic message and determining the electronic message contains a pointer to content before a next electronic message is received, storing the downloaded content by the apparatus in a cache, disconnecting from the associated network, while disconnected from the associated network, outputting the received electronic message and the downloaded content from the cache;

wherein the configurable download preferences further comprise a list of sources from which content can be automatically downloaded;

wherein the apparatus determines whether a source associated with a link is in the list of sources; and wherein the apparatus limits downloading of content to content associated with links to sources determined to be in the list of sources.

17. The apparatus of claim 16, wherein the selectively downloading includes downloading the content using a protocol different from a protocol used to receive the message.

18. The apparatus of claim 16, wherein the configurable download preferences comprises a maximum depth of content that may be downloaded per each pointer.

19. The apparatus of claim 16, wherein the configurable download preferences comprises a maximum number of web pages of content that may be downloaded per each pointer.

20. The apparatus of claim 16, wherein the configurable download preferences comprises a maximum depth of content that may be downloaded per each message.

21. The apparatus of claim 16, wherein the configurable download preferences comprises a maximum amount of time used to download the content per each message.

22. The apparatus of claim 16, wherein the configurable download preferences comprises a maximum number of web pages of content that may be downloaded per each message.

23. The apparatus of claim 16, wherein the configurable download preferences comprises a maximum amount of time used to download the content.

24. The apparatus of claim 16, wherein the configurable download preferences comprises parameters that limit an amount of time spent downloading content per each pointer.

25. An apparatus, comprising:

an interface coupled to a network for receiving a plurality of messages that contains a pointer to content from an electronic message source;

a memory comprising configuration settings; and, a processor coupled to the interface and having one or more stored sequences of instructions which, when executed by the processor, cause the processor to carry out:

determine by the processor for each message whether the message contains a pointer to content responsive to receiving the electronic message;

accessing stored credentials by the processor to enable access to the content;

automatically preloading for each message by the processor at least some of the content over the network from a content source in accordance with configurable download preferences stored in the memory responsive to receiving the electronic message and determining the electronic message contains a pointer to content, storing the downloaded content for each message by the processor in a cache, and outputting for at least one of the plurality of received messages the preloaded content from the cache without having to wait for the content to load over the network;

wherein the configurable download preferences further comprises a list of sources from which content can be automatically downloaded;

wherein the processor determines whether a source associated with a link is in the list of sources; and wherein the processor limits automatic preloading of content to content associated with links to sources determined to be in the list of sources.

26. The apparatus of claim 25, wherein the configurable download preferences comprises a maximum depth of content that may be downloaded per each message.

27. The apparatus of claim 25, wherein the configurable download preferences comprises a maximum amount of time used to download the content.

28. A computer program product, having a computer readable medium having instructions thereon capable of causing a data processing system to perform a method comprising:

receiving by the data processing system an electronic message from an electronic message source;

determining by the data processing system whether the electronic message contains a pointer to content responsive to receiving the electronic message;

accessing stored credentials by the data processing system to enable access to the content;

automatically downloading by the data processing system at least some of the content over an associated network from a content source in accordance with stored configurable download preferences responsive to receiving the electronic message and determining the electronic message contains a pointer to content before a second electronic message is received;

storing the downloaded content by the data processing system in a cache;

disconnecting from the associated network;

while disconnected from the associated network, outputting the received message and the downloaded content from the cache;

wherein the configurable download preferences further comprises a list of sources from which content can be automatically downloaded;

wherein the data processing system determines whether a source associated with a link is in the list of sources; and wherein the data processing system limits automatic downloading of content to content associated with links to sources determined to be in the list of sources.

29. The computer program product of claim 28, wherein the downloading includes selectively downloading the content using a protocol different from a protocol used to receive the message.

30. The computer program product of claim 28, wherein the configurable download preferences comprises a maximum depth of content that may be downloaded per each pointer.

31. The computer program product of claim 28, wherein the configurable download preferences comprises a maximum number of web pages of content that may be downloaded per each pointer.

32. The computer program product of claim 28, wherein the configurable download preferences comprises a maximum depth of content that may be downloaded per each message.

33. The computer program product of claim 28, wherein the configurable download preferences comprises a maximum amount of time used to download the content per each message.

34. The computer program product of claim 28, wherein the configurable download preferences comprises a maximum number of web pages of content that may be downloaded per each message.

35. The computer program product of claim 28, wherein the configurable download preferences comprises a maximum amount of time used to download the content.

36. The computer program product of claim 28, wherein the configurable download preferences comprises parameters that limit an amount of time spent downloading content per each pointer.

37. A computer program product, having a computer readable medium having instructions thereon capable of causing a data processing system to perform a method comprising:

receiving a plurality of messages, over a network, that contains a pointer to content, from an electronic message source;

for each of the plurality of messages:

determining by the data processing system whether the message contains a pointer to content responsive to receiving the electronic message;

accessing stored credentials by the data processing system to enable access to the content;

automatically preloading by the data processing system at least some of the content over the network from a content source in accordance with stored configurable download preferences responsive to receiving the electronic message and determining the electronic message contains a pointer to content; and outputting the received message and the preloaded content without having to wait for the content to load;

wherein the configurable download preferences further comprises a list of sources from which content can be automatically downloaded;

wherein the data processing system determines whether a source associated with a link is in the list of sources; and wherein the data processing system limits automatic downloading of content to content associated with links to sources determined to be in the list of sources.

38. The computer program product of claim 37, wherein the configurable download preferences comprises a maximum depth of content that may be downloaded per each message.

39. The computer program product of claim 37, wherein the configurable download preferences comprises a maximum amount of time used to download the content.

40. A system, comprising:

means for receiving a message from a message source to a message reader;

means for determining by the message reader whether the message contains a pointer to content responsive to receiving the electronic message;

means for accessing stored credentials by the message reader to enable access to the content, means for automatically downloading by the message reader at least some of the content over the network from a message source in accordance with stored configurable download preferences responsive to receiving the electronic message and determining the electronic message contains a pointer to content before a second electronic message is received, means for storing the downloaded content by the message reader in a cache, means for disconnecting from the network, means for enabling a user to read the received message after disconnecting from the network, and means for outputting the downloaded content from the cache after disconnecting from the network;

wherein the configurable download preferences further comprises a list of sources from which content can be automatically downloaded;

wherein the message reader determines whether a source associated with a link is in the list of sources; and wherein the message reader limits automatic downloading of content to content associated with links to sources determined to be in the list of sources.

41. A system, comprising:

means for receiving a plurality of messages from a message source to a message reader;

means for storing configurable download preferences;

means for determining for each message by the message reader whether the message contains a pointer to content responsive to receiving the electronic message;

means for accessing for each message stored credentials by the message reader to enable access to the content;

means for automatically preloading by the message reader for each message at least some of the content over the network from a content source in accordance with stored configurable download preferences responsive to determining the electronic message contains a pointer to content, means for storing the downloaded content by the message reader for each message in a cache, and means for outputting at least one received message and the preloaded content without having to wait for the content to load;

wherein the configurable download preferences further comprises a list of sources from which content can be automatically downloaded;

wherein the message reader determines whether a source associated with a link is in the list of sources; and wherein the message reader limits automatic downloading of content to content associated with links to sources determined to be in the list of sources.

* * * * *